(12) United States Patent
Taira

(10) Patent No.: US 7,269,237 B2
(45) Date of Patent: Sep. 11, 2007

(54) NOISE CANCELLER

(75) Inventor: Masaaki Taira, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 534 days.

(21) Appl. No.: 10/483,054

(22) PCT Filed: Jul. 8, 2002

(86) PCT No.: PCT/JP02/06916

§ 371 (c)(1), (2), (4) Date: Jan. 7, 2004

(87) PCT Pub. No.: WO03/007490

PCT Pub. Date: Jan. 23, 2003

(65) Prior Publication Data

US 2004/0190656 A1 Sep. 30, 2004

(30) Foreign Application Priority Data

Jul. 13, 2001 (JP) ............................. 2001-213356

(51) Int. Cl.
*H04L 25/08* (2006.01)
(52) U.S. Cl. ...................................... 375/346
(58) Field of Classification Search ............... 375/346; 381/13, 71.4; 329/320; 455/63.1
See application file for complete search history.

(56) References Cited

U.S. PATENT DOCUMENTS 4,501,014 A 2/1985 Bluthgen
6,690,805 B1 * 2/2004 Tsuji et al. ................ 381/94.1

FOREIGN PATENT DOCUMENTS

| EP | 1069693 A2 * | 1/2001 |
|----|--------------|--------|
| JP | 58-7933 A1 | 1/1983 |
| JP | 6-177786 | 6/1994 |
| JP | 06-177786 A1 | 6/1994 |
| JP | 06177786 A * | 6/1994 |
| JP | 2001-36420 A1 | 2/2001 |

* cited by examiner

*Primary Examiner*—Don N. Vo
(74) *Attorney, Agent, or Firm*—McDermott Will & Emery LLP

(57) ABSTRACT

If a mode calculating section (52) judges that an inputted modulated signal is nearly in a no-sound state, the interpolation width determined by an interpolation width calculating section (53) is increased, whereas if the mode calculating section (52) judges that the inputted modulated signal contains a lot of high-frequency components, the interpolation width determined by the interpolation width calculating section (53) is decreased.

12 Claims, 4 Drawing Sheets

THRESHOLD VALUE

NOISE CANCELLER

TECHNICAL FIELD

The present invention relates to a noise canceler for canceling noise contained in an inputted signal, and more particularly to a noise canceler as incorporated in an FM receiver apparatus to cancel noise contained in an FM reception signal.

BACKGROUND ART

In a car-mounted FM receiver apparatus, the received FM reception signal has pulse noise such as ignition noise superimposed thereon, and therefore, for the purpose of canceling such pulse noise contained in the FM reception signal, there is provided a noise canceler.

With a conventional noise canceler, when a composite signal having pulse noise superimposed thereon as shown in FIG. 6A is received, the pulse noise is detected by passing the composite signal through a HPF (high-pass filter). When the HPF detects the pulse noise, a pulse noise detection signal as shown in FIG. 6B is produced. When the pulse noise detection signal is fed to an integrator, the integrator yields an output as shown in FIG. 6C.

Specifically, when the integrator is fed with the pulse noise detection signal, a capacitor included in the integrator is charged, making the output of the integrator higher than a threshold value. When the output of the integrator becomes higher than a predetermined threshold value in this way, the integrator is so controlled that the capacitor is discharged, causing the output of the integrator to decrease gradually. By comparing the output of this integrator and the predetermined threshold value, a gate control signal is produced. With this gate control signal, the operation of a gate circuit for canceling the pulse noise is controlled.

Thus, when the output of the integrator is as shown in FIG. 6C, a pulse noise detection signal is produced, and while the output of the integrator remains higher than the threshold value, the gate control signal remains high. The gate circuit performs signal processing such that the signal level of the composite signal is held at its signal level immediately before the occurrence of the pulse noise. As a result, the composite signals is output after having the pulse noise cancelled therefrom as shown in FIG. 6D.

However, in a noise canceler that cancels pulse noise by operating as shown in FIGS. 6A to 6D, during the occurrence of pulse noise, the gate circuit maintains the signal level immediately before the occurrence of pulse noise irrespective of the state of the reception signal. This causes distortion in the reception signal, resulting in unsatisfactory quality of the sound reproduced therefrom.

Incidentally, Japanese Patent Application Laid-Open No. H8-56168 proposes an FM receiver apparatus that switches filters according to the state of reception, wherein the gate period during which the signal level of the reception signal is maintained to cancel pulse noise is varied so as to achieve appropriate cancellation of the pulse noise. This method, however, is no different from the operations illustrated in FIGS. 6A to 6D in that the pulse noise is cancelled by maintaining the signal level immediately before the occurrence thereof, causing distortion in the reception signal.

DISCLOSURE OF THE INVENTION

An object of the present invention is to provide a noise canceler that performs interpolation according to the state of the reception signal after canceling pulse noise therefrom.

To achieve the above object, according to the present invention, a noise canceler that includes a pulse position determining section for detecting pulse noise superimposed on an audio signal and that cancels from the input signal the pulse noise detected by the pulse position determining section is provided with: a state calculating section that evaluates the state of the audio signal; an interpolation width calculating section that, according to the proportion of high-frequency components contained in the audio signal as evaluated by the state calculating section, sets an interpolation width at the data position at which to cancel the pulse noise and perform interpolation; and a pulse noise reducing section that processes the data present within the interpolation width set by the interpolation width calculating section, with the center of the interpolation width located at the data position at which the pulse position determining section has detected the pulse noise from the audio signal, so as to cancel the pulse noise and perform interpolation and that then outputs the audio signal thus processed.

BEST MODE FOR CARRYING OUT THE INVENTION

Figure 1:
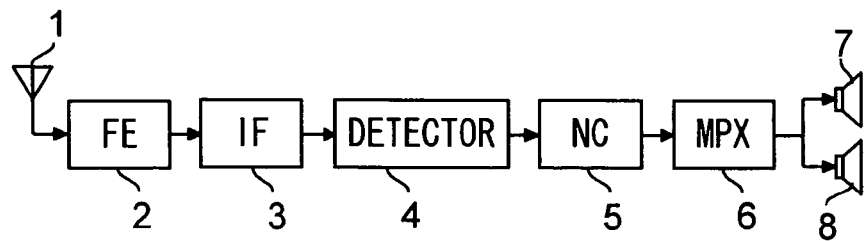
FIG. 1 is a block diagram showing the internal configuration of an FM receiver apparatus incorporating a noise canceler according to the invention.
Figure 2:
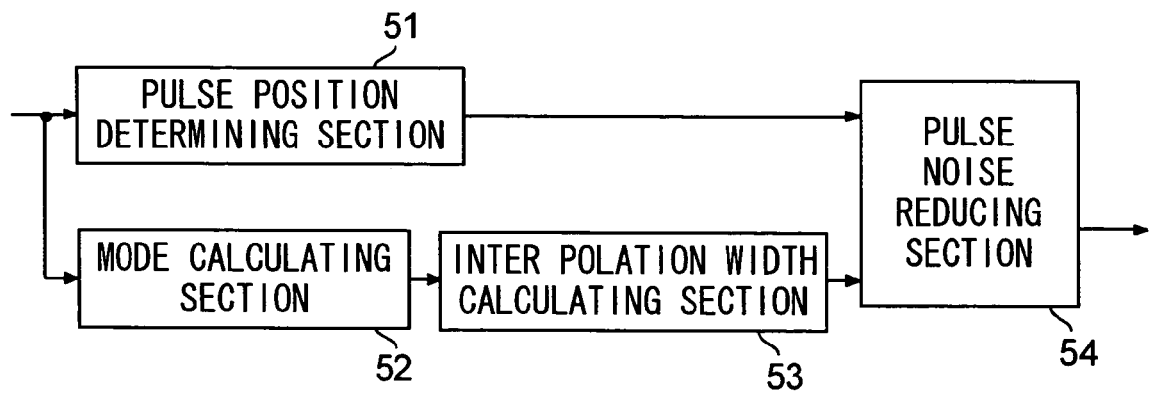
FIG. 2 is a block diagram showing the internal configuration of the noise canceler according to the invention.

Hereinafter, an embodiment of the present invention will be described with reference to the drawings. FIG. 1 is a block diagram showing the internal configuration of an FM receiver apparatus incorporating a noise canceler according to the invention. FIG. 2 is a block diagram showing the internal configuration of the noise canceler according to the invention.

The FM receiver apparatus shown in FIG. 1 includes: an antenna 1 for receiving broadcast signals; a front-end section (FE) 2 for selecting, from among the broadcast signals received by the antenna 1, the FM reception signal of a desired channel and subjecting it to RF amplification; an intermediate frequency amplifier section (IF) 3 for converting the FM reception signal selected by the FE 2 to an intermediate frequency of 10.7 MHz and amplifying it; a detector section 4 for extracting a modulation signal by detecting the FM reception signal that have been subjected to frequency conversion by the IF 3; a noise canceler (NC) 5 for canceling noise superimposed on the modulation signal obtained through detection by the detector section 4; a multiplexer (MPX) 6 for separating the modulation signal having noise cancelled therefrom by the NC 5 into audio signals to be fed to a left and a right speaker 7 and 8; and a left and a right speaker 7 and 8 from which to reproduce sound.

When the FM reception signal of a desired channel frequency is selected by the FE 2 from among the broadcast signals received by the antenna 1, then, in the IF 3, the selected FM reception signal is mixed with a local oscillation signal and is thereby converted to an intermediate frequency. Then, in the detection section 4, the FM reception signal thus converted into an intermediate frequency is detected by a detection method such as one based on a phase-locked loop to obtain a modulation signal. Moreover, in the detection section 4, the modulation signal is converted into a digital signal. This modulation signal is then fed to the NC 5, where the noise superimposed on the modulation signal is detected and cancelled. The modulation signal thus having noise cancelled therefrom is then fed to the MPX 6, which processes the main and sub channel signals contained in the modulation signal to separate it into audio signals to be fed to the left and right speakers 7 and 8, and then feeds those audio signals to the left and right speakers 7 and 8.

Now, the NC 5 incorporated in this FM receiver apparatus will be described. The NC 5 shown in FIG. 2 includes a pulse position determining section 51 for detecting pulse noise superimposed on the modulation signal obtained from the detection section 4; a mode calculating section 52 for evaluating the state of the modulation signal; an interpolation width calculating section 53 for setting, according to the state of the modulation signal as evaluated by the mode calculating section 52, an interpolation width within which to perform interpolation around the position at which the pulse noise has been detected; and a pulse noise reducing section 54 for canceling the pulse noise detected by the pulse position determining section 51 and performing interpolation after cancellation of the pulse noise.

When the modulation signal in the form of discrete digital signals is fed to the NC 5, the pulse position determining section 51 detects the position at which the pulse noise is superimposed on the modulation signal. Here, for example, the modulation signal is first filtered with a high-pass filter, and is then formed into an absolute value with an absolute value circuit. The modulation signal thus formed into an absolute value is then passed through a limiter circuit so that a portion thereof with an extremely large amplitude is removed therefrom, and is then fed to a time-average circuit to calculate the time average. Then, the signal level of the modulation signal formed into an absolute value is compared with the time average, and, if the signal level is sufficiently high relative to the time average, pulse noise is recognized to be occurring, and its position is detected.

Incidentally, the inventor of the present invention proposed the detail of the pulse position determining section 51, for example, in Japanese Patent Application Laid-Open No. 2001-102944, titled "Noise Detection Apparatus in a Radio Receiver." In the embodiment under discussion, the pulse position determining section is assumed to be based on the noise detection apparatus proposed in the Japanese Patent Application Laid-Open No. 2001-102944. Needless to say, however, the pulse position determining section may be configured in any other manner.

In the mode calculating section 52, first, the modulation signal fed thereto is squared to form a squared value, and the amplitude of the modulation signal during a predetermined period is measured. The measured amplitude of the modulation signal is compared with a predetermined threshold value, and, if the amplitude remains lower than the threshold value during the predetermined period, the modulation signal is recognized to be nearly in a no-sound state. If the modulation signal is recognized not to be in a no-sound state, then the ratio of the high-frequency components filtered from the modulation signal by a HPF during the predetermined period to all the components of the modulation signal is calculated, and, if the calculated ratio is greater than a predetermined value, the modulation signal is judged to contain a high proportion of high-frequency components.

In this way, in the mode calculating section 52, first, whether or not the input modulation signal is in a first mode, i.e., nearly in a no-sound state, is checked. Next, if the input modulation signal is found not to be in the first mode, whether it is in a second mode, in which it contains a low proportion of high-frequency components, or in a third mode, in which it contains a high proportion of high-frequency components, is checked. Thus, the mode calculating section 52 distinguishes between three modes, namely the first to third modes.

Having distinguished between the three modes, the mode calculating section 52 notifies the interpolation width calculating section 53 of the recognized mode. The interpolation width calculating section 53 sets the interpolation width over which to cancel noise; that is, it sets the interval of time over which, when pulse noise is detected, interpolation is performed for waveform shaping after cancellation of the pulse noise. Here, if the mode calculating section 52 has recognized the first mode, the interpolation width is set to be longest, and, if the mode calculating section 52 has recognized the third mode, the interpolation width is set to be shortest.

Here, since the modulation signal is fed in in the form of sampled discrete signals, the interpolation width is set in terms of the number of data over which to perform interpolation. Specifically, in the first mode, the interpolation width encompasses ten data including the one at which the pulse noise was detected; in the second mode, the interpolation width encompasses seven data including the one at which the pulse noise was detected; and, in the third mode, the interpolation width encompasses five data including the one at which the pulse noise was detected.

Moreover, in the pulse noise reducing section 54, to remove the discontinuity between the portion where interpolation was performed and thus pulse noise was cancelled and the remaining portion where no interpolation was performed, the modulation signal is then subjected to processing with a LPF (low-pass filter). The cut-off frequency of the processing with the LPF here is set according to the mode. Specifically, the cut-off frequency is set to be lowest in the first mode and highest in the third mode.

Then, the data position at which the pulse noise is superimposed as detected by the pulse position determining section 51 and the interpolation width set by the interpolation width calculating section 53 at the data position at which the detected pulse noise is superimposed are fed to the pulse noise reducing section 54. Then, linear interpolation is performed by using the data preceding and succeeding the interpolation width, with the center of the interpolation width located at the data position at which the pulse noise is superimposed, so as to determine the data at each data position within the interpolation width.

Figure 3:
FIG. 3 is a diagram showing the operation performed to achieve correction.

For example, suppose that, as shown in FIG. 3, pulse noise is detected at a data position Y3, and that the third mode is recognized, with the result that the number of data within the interpolation width is set to be five. Moreover, let the signal levels at the individual data positions Y1 to Y5 within the interpolation width be y1 to y5, let the signal level at the data position Xa immediately before the interpolation width be xa, and let the signal level at the data position Xb immediately after the interpolation width be xb. Then, the signal levels y1 to y5 at the individual data positions Y1 to Y5 within the interpolation width are set as follows:

$$y1=(xb-xa)/6+xa$$

$$y2=2\times(xb-xa)/6+xa$$

$$y3=3\times(xb-xa)/6+xa$$

$$y4=4\times(xb-xa)/6+xa$$

$$y5=5\times(xb-xa)/6+xa$$

Figure 4A:
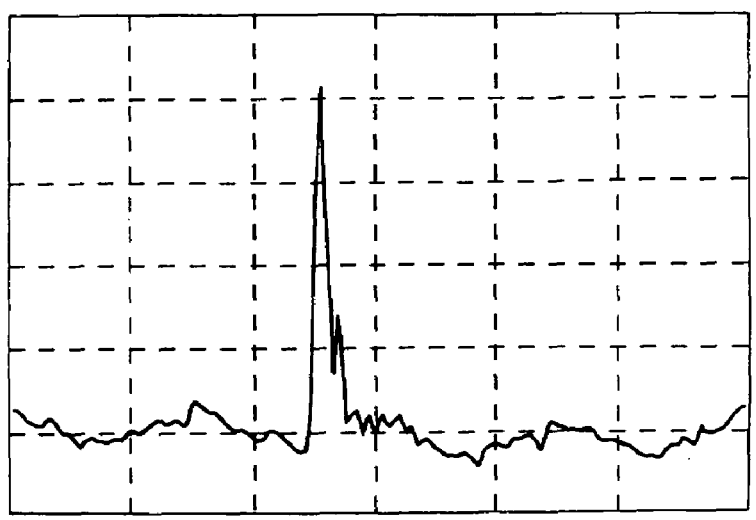
FIGS. 4A to 4C are diagrams showing how a modulation signal in a no-sound state is corrected.
Figure 4B:
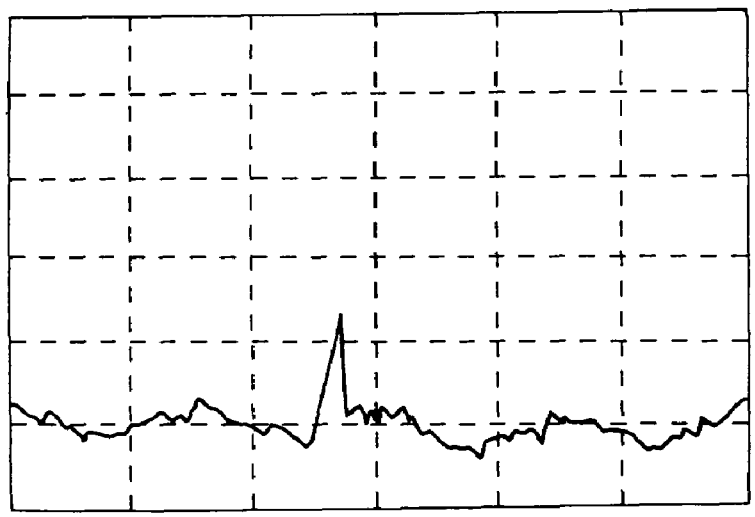
Figure 4C:
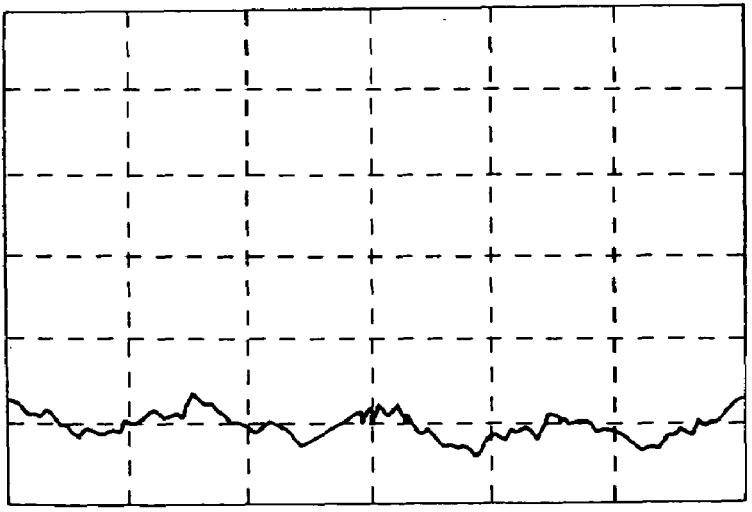
Figure 5A:
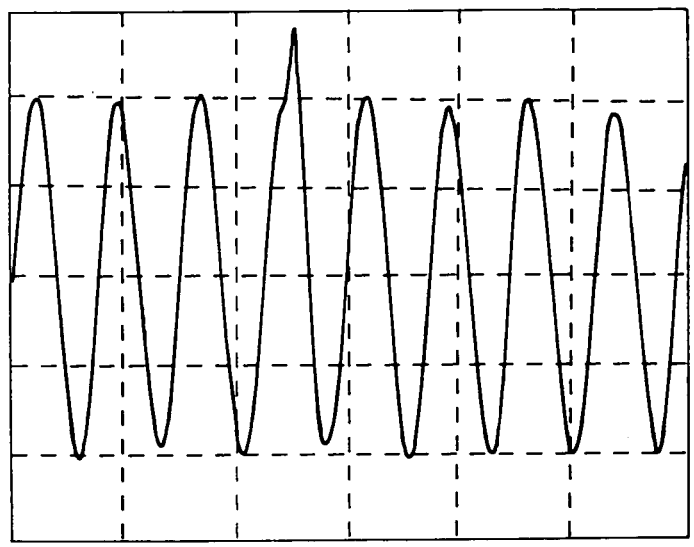
FIGS. 5A to 5C are diagrams showing how a modulation signal of a sinusoidal wave having a frequency of 3 kHz is corrected.
Figure 5B:
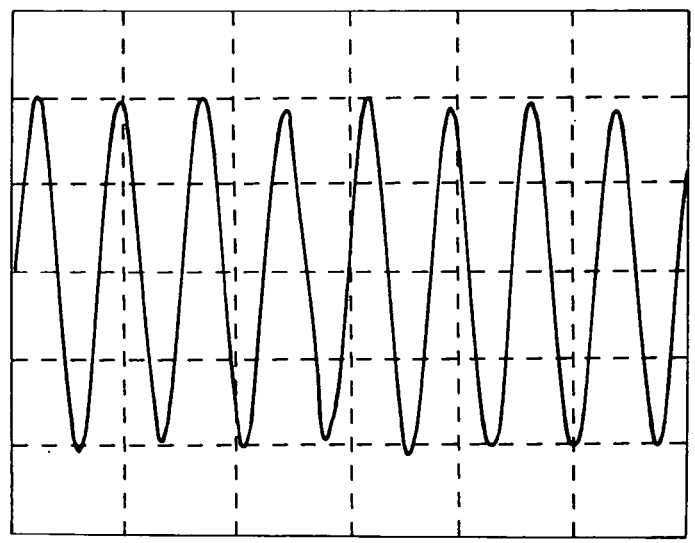
Figure 5C:
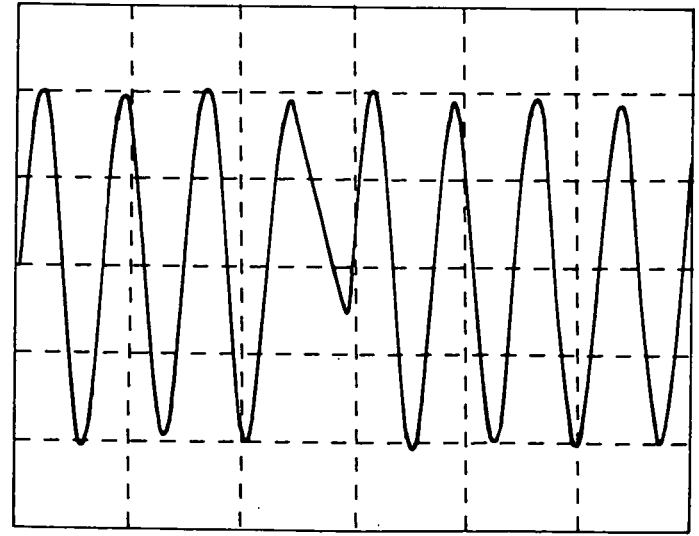
Figure 6A:
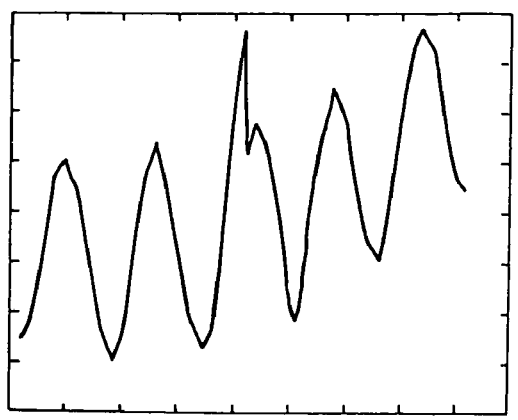
FIGS. 6A to 6D are diagrams showing various signals illustrating the operation of a conventional noise canceler.
Figure 6B:
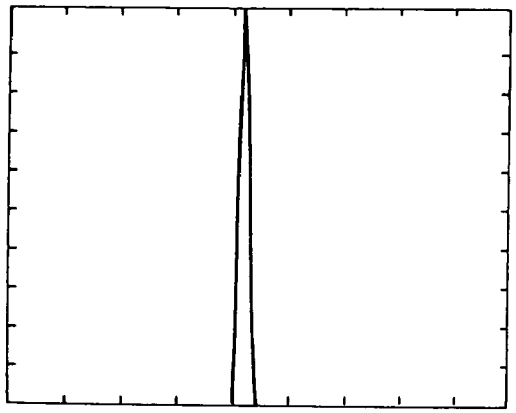
Figure 6C:
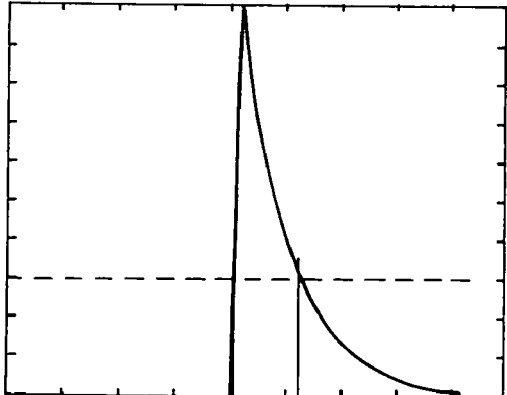
Figure 6D:
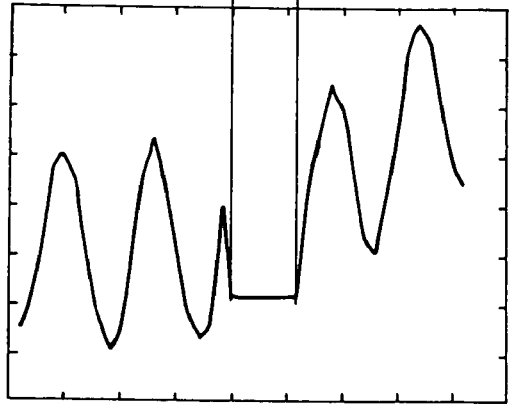

FIGS. 4A to 4C and FIGS. 5A to 5C show how this pulse cancellation is performed in a no-sound state and with a sinusoidal wave having a frequency of 3 kHz, respectively. FIGS. 4A and 5A show the modulated signal having pulse noise superimposed thereon, FIGS. 4B and 5B show the modulated signal after being subjected to interpolation with the number of data within the interpolation width set to be five, and FIGS. 4C and 5C show the modulated signal after being subjected to interpolation with the number of data within the interpolation width set to be ten. FIGS. 4A to 4C and FIGS. 5A to 5C are diagrams showing how interpolation is performed differently with different interpolation widths.

When pulse noise is superimposed on the modulation signal in a no-sound state (in the first mode) as shown in FIG. 4A, if the number of data within the interpolation width is set to be five, the pulse noise is not completely cancelled from the modulation signal after interpolation as shown in FIG. 4B, leaving behind an uncorrected part of the pulse noise. In this case, by increasing the number of data within the interpolation width to ten, it is possible to completely cancel the pulse noise and in addition restore the portion where the pulse noise was cancelled and interpolation was performed to the no-sound state as shown in FIG. 4C.

On the other hand, when pulse noise is superimposed on the modulation signal when it is a sinusoidal wave having a frequency of 3 kHz (in the third mode) as shown in FIG. 5A, if the number of data within the interpolation width is set to be ten, the modulation signal after interpolation and pulse noise cancellation is output with a distorted waveform as shown in FIG. 5C. In this case, by reducing the number of data within the interpolation width to five, it is possible to completely cancel the pulse noise and in addition restore the portion where the pulse noise was cancelled and interpolation was performed to close to a sinusoidal wave having a frequency of 3 kHz as shown in FIG. 4C.

Thus, the higher the proportion of high-frequency components that the modulation signal contains is, the shorter the interpolation width needs to be set to be to achieve appropriate interpolation. In this way, in the pulse noise reducing section 54, pulse noise is cancelled and interpolation is performed; then, through processing using an LPF, the discontinuity between the interpolated and non-interpolated portions is removed. As a result, the pulse noise reducing section 54 outputs the modulation signal with reduced pulse noise and with alleviated distortion resulting from correction.

In this embodiment, the mode calculating section distinguishes between three modes, namely the first to third modes in which the modulation signal is in a no-sound state, contains a low proportion of high-frequency components, and contains a high proportion of high-frequency components, respectively. It is, however, also possible to use a plurality of types of filter to more finely distinguish between different states of the modulation signal. In that case, by setting the optimum interpolation width for each state, it is possible to alleviate the distortion that occurs in the modulation signal as a result of interpolation. Interpolation may be achieved by any other method than linear interpolation, which is simple. Instead of converting the modulation signal into a digital signal in the detector section, it may be converted into a digital signal after being converted to an intermediate frequency so as to be subjected to digital signal processing in the circuit blocks succeeding the IF stage.

INDUSTRIAL APPLICABILITY

According to the present invention, it is possible to adjust, according to the state of an input signal, the interpolation width over which to perform interpolation. This makes it possible to perform optimum interpolation in different states. This helps alleviate the distortion that occurs in the waveform of the input signal as a result of interpolation and thereby obtain a natural waveform. In a no-sound state or a state close thereto, by increasing the interpolation width, it is possible to prevent an uncorrected part of the superimposed noise from being left behind. On the other hand, when the proportion of high-frequency components is high, by reducing the interpolation width, it is possible to alleviate the distortion in the waveform after interpolation. Moreover, by subjecting the input signal after interpolation to processing with an LPF, it is possible to alleviate the discontinuity between the interpolated and non-interpolated portions.

The invention claimed is:

1. A noise canceller including a pulse position determining section for detecting pulse noise superimposed on an audio signal, the noise canceller canceling from the input signal the pulse noise detected by the pulse position determining section, comprising:
    a state calculating section that evaluates state of the audio signal;
    an interpolation width calculating section that, according to a proportion of high-frequency components contained in the audio signal as evaluated by the state calculating section, sets an interpolation width at a data position at which to cancel the pulse noise and perform interpolation; and
    a pulse noise reducing section that processes data present within the interpolation width set by the interpolation width calculating section, with a center of the interpolation width located at a data position at which the pulse position determining section has detected the pulse noise from the audio signal, so as to cancel the pulse noise and perform interpolation and that then outputs the audio signal thus processed.

2. A noise canceller as claimed in claim 1, wherein, in the interpolation width calculating section,
    if the audio signal is judged to be nearly in a no-sound state by the state calculating section, the interpolation width is set to be longest, and,
    the higher a proportion of high-frequency components that the audio signal is judged to contain by the state calculating section is, the shorter the interpolation width is set to be.

3. A noise canceller as claimed in claim 2, wherein, in the state calculating section, first whether or not the audio signal is in a no-sound state is checked, and then whether or not the audio signal contains a high proportion of high-frequency components is checked.

4. A noise canceller as claimed in claim 3, wherein, in the pulse noise reducing section, the audio signal having been subjected to interpolation is further filtered with a low-pass filter.

5. A noise canceller as claimed in claim 4, wherein, in the interpolation width calculating section, the higher the proportion of high-frequency components that the audio signal is judged to contain by the state calculating section is, the higher a cut-off frequency of the low-pass filter is set to be before the audio signal is fed to the pulse noise reducing section.

6. A noise canceller as claimed in claim 2, wherein, in the pulse noise reducing section, the audio signal having been subjected to interpolation is further filtered with a low-pass filter.

7. A noise canceller as claimed in claim 6, wherein, in the interpolation width calculating section, the higher the proportion of high-frequency components that the audio signal is judged to contain by the state calculating section is, the higher a cut-off frequency of the low-pass filter is set to be before the audio signal is fed to the pulse noise reducing section.

8. A noise canceller as claimed in claim 1, wherein, in the state calculating section, first whether or not the audio signal is in a no-sound state is checked, and then whether or not the audio signal contains a high proportion of high-frequency components is checked.

9. A noise canceller as claimed in claim 8, wherein, in the pulse noise reducing section, the audio signal having been subjected to interpolation is further filtered with a low-pass filter.

10. A noise canceller as claimed in claim 9, wherein, in the interpolation width calculating section, the higher a proportion of high-frequency components that the audio signal is judged to contain by the state calculating section is, the higher a cut-off frequency of the low-pass filter is set to be before the audio signal is fed to the pulse noise reducing section.

11. A noise canceller as claimed in claim 1, wherein, in the pulse noise reducing section, the audio signal having been subjected to interpolation is further filtered with a low-pass filter.

12. A noise canceller as claimed in claim 11, wherein, in the interpolation width calculating section, the higher a proportion of high-frequency components that the audio signal is judged to contain by the state calculating section is, the higher a cut-off frequency of the low-pass filter is set to be before the audio signal is fed to the pulse noise reducing section.

* * * * *